(12) United States Patent
Buelow

(10) Patent No.: US 8,634,724 B2
(45) Date of Patent: Jan. 21, 2014

(54) POWER MANAGEABLE OPTICAL OFDM TRANSPONDER

(75) Inventor: Henning Buelow, Kornwestheim (DE)

(73) Assignee: Alcatel Lucent, Paris (FR)

(*) Notice: Subject to any disclaimer, the term of this patent is extended or adjusted under 35 U.S.C. 154(b) by 105 days.

(21) Appl. No.: 13/147,918

(22) PCT Filed: Feb. 8, 2010

(86) PCT No.: PCT/EP2010/051474
§ 371 (c)(1),
(2), (4) Date: Aug. 4, 2011

(87) PCT Pub. No.: WO2010/097282
PCT Pub. Date: Sep. 2, 2010

(65) Prior Publication Data
US 2011/0305462 A1    Dec. 15, 2011

(30) Foreign Application Priority Data
Feb. 26, 2009    (EP) .................................... 09290138

(51) Int. Cl.
*H04B 10/00*    (2013.01)
(52) U.S. Cl.
USPC .............. 398/158; 398/192; 398/208; 398/79
(58) Field of Classification Search
None
See application file for complete search history.

(56) References Cited

U.S. PATENT DOCUMENTS 7,693,429 B1 *    4/2010    Lowery .......................... 398/192
2005/0265476 A1    12/2005    Naito (Continued)

FOREIGN PATENT DOCUMENTS

JP    2005347902    12/2005
JP    2006203877    8/2006

(Continued)

OTHER PUBLICATIONS

Wong et al., "Multiuser OFDM with Adaptive Subcarrier, Bit, and Power Allocation", Oct. 1999, IEEE Journal on Selected Areas in Communications, vol. 17, No. 10, pp. 1747-1757.*

(Continued)

*Primary Examiner* — Ken Vanderpuye
*Assistant Examiner* — David Lambert
(74) *Attorney, Agent, or Firm* — Carmen Patti Law Group, LLC

(57) ABSTRACT

The invention relates to the field of optical transmission systems. In particular, the invention relates to a system and a method for adjusting an optical OFDM transmission system in a power optimized manner. An optical OFDM transmitter (310) operating at an overall bit-rate is provided. It comprises an adjustable mapping unit (314) associated with one of N OFDM subcarriers, operable to map M bits of a digital input signal (360) into a constellation point, thereby yielding a subcarrier signal of the corresponding OFDM subcarrier. Furthermore, it comprises an adjustable transformation unit (315, 316), operable to transform the subcarrier signal to yield an electrical output signal. In addition, the OFDM transmitter comprises an electrical-to-optical converter (324, 325), operable to convert the electrical output signal into an optical output signal. Finally, the OFDM transmitter comprises a control unit (311, 312), operable to select the number of OFDM subcarriers N and the number of bits M, such that the electrical power consumption of the OFDM transmitter (310) is minimized for the overall bit-rate and operable to adjust the adjustable mapping unit (314) and the adjustable transformation unit (315, 316) according to the selected numbers M and N.

14 Claims, 3 Drawing Sheets

(56) References Cited

U.S. PATENT DOCUMENTS

Figure 1A:
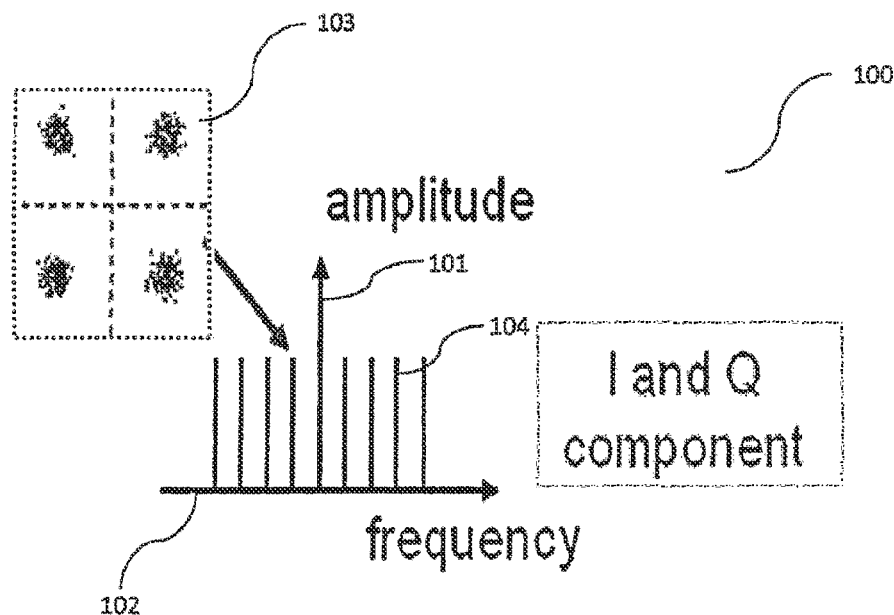

2006/0246916 A1* 11/2006 Cheng et al. ............... 455/450
2009/0116592 A1    5/2009 Nambar et al.
2010/0028002 A1*  2/2010 Qian et al. .................. 398/79

FOREIGN PATENT DOCUMENTS

| WO | 2004/025870 | 3/2004 |
|----|-------------|--------|
| WO | 2007/064165 | 6/2007 |
| WO | 2007/139026 | 12/2007 |
| WO | 2008/055247 | 5/2008 |

OTHER PUBLICATIONS

Bjorn et al., "Energy-Scalable OFDM Transmitter Design and Control", Jul. 2006, DAC 2006, Jul. 24-28, 2006, San Francisco, California, USA, pp. 536-541.*

Tang, J. et al; Maximizing the Transmission Performance of Adaptively Modulated Optical OFDM Signals in Multimode-Fiber Links by Optimizing Analog-to-Digital Converters; Journal of Lightwave Technology, IEEE Service Center, New York, NY, US; vol. 25, No. 3; pp. 787-798; XP011176454; ISSN:0733-8724.

Duong, T. et al; Experimental demonstration of 10Gbit/s transmission over 110km SMF by direct modulation of 2 GHz bandwidth DFB laser using Discrete Multi-tone Modulation for Passive Optical Network; Optical Fiber Communication/National Fiber Optic Engineers Conference; 2008; OFC/NFOEC 2008; Conference on; IEEE; Piscataway, NJ; USA; Feb. 24, 2008; pp. 1-3; XP031391366; ISBN: 978-1-55752-856-8.

WIND-FLEX; WIND-FLEX A Flexible Radio Interface Architecture for Short-Range High-Speed Wireless Networking; WIND-FLEX White Paper v33, doc., May 20, 2002; <online> http://www.wirelesscommunication.nl/reference/pdfandps/windflex.pdf.

* cited by examiner

POWER MANAGEABLE OPTICAL OFDM TRANSPONDER

The invention relates to the field of optical transmission systems. In particular, the invention relates to a system and a method for adjusting an optical OFDM trans-mission system in a power optimized manner.

In the near and medium future, transponders for 40 Gb/s, 100 Gb/s and up to 1 Tb/s are expected to be based on coherent detection in conjunction with digital signal processing (DSP). This technology exhibits a very high performance in terms of reach, i.e. high distortion tolerance and high sensitivity, but this advantage is accompanied by high power consumption and power dissipation.

Commonly the network resources are designed for a worst case scenario with regards to transmission channel conditions and bit-rate requirements, therefore using "high-end" transponders. In common electronics layouts of these transponders for coherent transmission systems, power intensive system elements such as DSPs (digital signal processors), ADC (analog-to-digital converters), DAC (digital-to-analog converter) and drive amplifiers for modulators are designed for the maximum achievable bandwidth. This maximum bandwidth, however, determines the level of power consumption of the transmission system. In typical optical OFDM transponders a switching to reduced power consumption in the case of less demanding, i.e. "low end", use is not possible.

The proposed optical OFDM transponder and the corresponding OFDM receiver allow controlling a trade-off between power consumption and reach/bit-rate. Hence it is possible to adjust and to automatically reconfigure a network based on the available and required network resources in such a way that it is also power optimized. By reducing the power consumption of OFDM transponders and receivers, the energy related operation costs of a network are reduced. Furthermore, the reliability of network elements is increased and the average cooling requirements of cabinets, racks and shelves in central office are relaxed.

According to a first aspect of the invention, an optical OFDM transmitter or transponder operating at an overall bit-rate is provided. The OFDM transmitter comprises a mapping unit associated with one of N OFDM subcarriers, operable to map M bits of a digital input signal into a constellation point, thereby yielding a subcarrier signal of the corresponding OFDM subcarrier. By way of example, the OFDM transmitter may further comprise a serial-to-parallel unit which isolates a block of M bits from the digital input signal. Then, the mapping unit maps this block of M bits by means of a constellation to a symbol of the subcarrier signal. The constellation is defined by the modulation scheme, e.g. PSK (phase shift keying) or QAM (Quadrature Amplitude Modulation). In typical OFDM transmitters successive blocks of the digital input signal are mapped into symbols. These symbols are assigned sequentially and in a cyclic manner to the N OFDM subcarriers, i.e. the first block, the $(N+1)^{th}$ block, the $(2N+1)^{th}$ block, etc. are assigned to the first OFDM subcarrier. The second block, the $(N+2)^{th}$ block, the $(2N+2)^{th}$ block, etc. are assigned to the second OFDM subcarrier, and so on. In this manner, subcarrier signals comprising symbols which each represent M bits of the digital input signal are obtained.

The OFDM transmitter further comprises an adjustable transformation unit, operable to transform the subcarrier signal of one of the N OFDM subcarriers to yield an electrical output signal. The transformation unit typically performs an inverse Fast Fourier Transform in order to transform the OFDM subcarrier signal from the frequency domain into the time domain. The transformation unit is adjustable in that the order of the transformation, i.e. the order of the inverse Fast Fourier Transform, may be adjusted to arbitrary values of N. The transformation unit may also comprise a parallel-to-serial unit which merges the N time domain signals into the electrical output signal. It should be noted that, typically, the electrical output signal is a complex signal, comprising two signal components, i.e. a real part signal component and an imaginary part signal component.

Furthermore, the OFDM transmitter may comprise a digital-to-analog converter, operable to convert a digital version of the electrical output signal into an analog version of the electrical output signal. This digital-to-analog conversion is usually performed separately for the real and imaginary component of the electrical output signal. The analog version of the electrical output signal may then pass through a power amplifier, which is operable to amplify the electrical output signal.

The optical OFDM transmitter further comprises an electrical-to-optical converter which is operable to convert the electrical output signal, e.g. the analog version of the amplified electrical output signal, into an optical output signal. Typically the conversion into the optical domain is performed by modulating an optical signal in an optical modulator with the electrical output signal.

Furthermore, the OFDM transmitter comprises a control unit which is operable to set the number of OFDM subcarriers N and the number of bits M, such that the electrical power consumption of the OFDM transmitter is minimized for the overall bit-rate. The control unit is also operable to adjust the adjustable mapping unit and the adjustable transformation unit in accordance to the selected numbers M and N. In other words, the control unit may take into account the overall bit-rate of the OFDM signal and may select a pair of parameters N and M which meets the overall bit-rate requirements and which minimizes the power consumption of the OFDM transmitter. The control unit then causes the adjustable mapping unit to use a constellation that maps M bits into a symbol and it causes the adjustable transformation unit to apply a transformation, e.g. an inverse Fourier Transform, of order N.

It should be noted that the control unit may also receive information related to an optimal pair of parameters N and M from an external unit, e.g. from a control or management plane or from a corresponding OFDM receiver. For the purpose of exchanging, i.e. transmitting and receiving, information related to the parameters N and M, the OFDM transmitter may further comprise a parameter transmission unit or a parameter exchange unit, which works in an analogous manner as the parameter transmission unit outlined below in the context of the corresponding OFDM receiver. The information related to the parameters N and M may be exchanged with a corresponding OFDM receiver and/or a control or management plane.

In addition to the overall bit-rate, other constraints, notably the transmission conditions of the optical transmission channel, may be taken into account when selecting the parameters N and M. These transmission conditions impact the bit-error-rate of a transmitted OFDM signal. The transmission conditions typically depend on the length of the optical transmission channel and the distortions (e.g. chromatic dispersion, polarization mode dispersion, etc.) caused by the optical transmission channel. In general, the parameters N and M need to be selected such that the bit-error-rate (BER) of the transmitted OFDM signal is below a certain pre-defined threshold value, e.g. $10^{-3}$. This BER, in conjunction with a forward-error correction (FEC) decoder, might then lead to an acceptable low post-FEC BER of e.g. $10^{-15}$.

According to another aspect of the invention, the optical OFDM transmitter comprises an adjustable power amplifier which is adjustable to the bandwidth of the electrical output signal. The number of OFDM subcarriers N and the number of bits M are selected, such that the electrical power consumption of the adjustable power amplifier is minimized. The power amplifier is usually a predominant source of power consumption in an OFDM transmitter. Its power consumption strongly depends on the bandwidth of the signal that is to be amplified. Consequently, it may be beneficial to select a parameter pair N and M which minimizes the bandwidth of the electrical output signal, while still meeting the requirements with regards to the overall bit-rate and possibly a target bit-error-rate.

Typically, the bandwidth of a power amplifier is defined by its cutoff frequency, which is the frequency for which the amplifier gain has dropped by −3 dB with respect to the operating gain, or by its transit frequency, which is the frequency for which the amplifier gain has dropped to 0 db. Both, the cutoff frequency and the transit frequency depend on the bias-current of the power amplifier and may be increased by increasing the bias-current. An increased bias-current, however, leads to an increased power consumption of the power amplifier. By way of example, in an adjustable power amplifier the bias-current could be adaptable in order to adapt the cutoff frequency of the power amplifier to the bandwidth of the electrical output signal.

As the power consumption of the adjustable power amplifier increases with the bandwidth of the electrical output signal, the number of OFDM subcarriers N and the number of bits M may also be selected such that the bandwidth of the electrical output signal is minimized.

According to a further aspect of the invention, the electrical power consumption is minimized such that for a determined subcarrier transmission condition of the one of the N OFDM subcarriers and for a target bit-error-rate, the maximum possible number of bits M is selected. In other words, when taking into account the transmission condition of the optical transmission channel and in particular the transmission conditions of a given OFDM subcarrier, then a constellation or modulation scheme is selected which allows to map a maximum possible number of bits M into one OFDM subcarrier symbol, while still meeting a target bit-error-rate. By way of example, the transmission condition of an OFDM subcarrier or of the complete optical transmission channel may be determined through the use of training sequences and/or pilot subcarriers which are transmitted over the optical transmission channel. At the OFDM receiver the bit-error rate of the transmitted training sequences is measured for a plurality of constellations. Then the constellation is selected which allows a maximum possible value M and which still meets the target bit-error rate.

The electrical power consumption may also be minimized in that for the overall bit-rate the OFDM transmitter is operated at and for a target bit-error-rate, the number of OFDM subcarriers N is minimized. It should be noted that in general the sub-carrier spacing between OFDM subcarrier is constant, i.e. the bandwidth spacing between two adjacent OFDM subcarriers is constant. If the number of OFDM subcarriers N is reduced and the sub-carrier spacing is kept unchanged, then the total bandwidth of the N OFDM subcarriers is reduced accordingly. In other words, as a result of minimizing the number of OFDM subcarriers, the bandwidth of the OFDM signal may be reduced. At outlined above, such reduced bandwidth may reduce the power consumption of the components of the OFDM transmitter, notably of the power amplifier. It should be noted that typically a minimization of the number of OFDM subcarriers N goes along with a maximization of the number of bits M.

The OFDM transmitter may further comprise an adjustable digital-to-analog converter. For such an adjustable digital-to-analog (D/A) converter, the processing or conversion rate may be adjustable to the bandwidth of the electrical output signal. For a signal with reduced bandwidth, the processing, i.e. sampling, rate of the D/A converter may be reduced, thereby also reducing the power consumption of the D/A converter.

The OFDM transmitter may further comprise a cyclic extension unit. Such cyclic extension unit is typically placed downstream of the transformation unit and upstream of the digital-to-analog converter. It is operable to insert cyclic prefix samples into the digital output signal, in order to avoid intersymbol interference. In general, such a cyclic extension unit is implemented using a digital signal processor, for which the power consumption depends on the processing rate. Consequently, a reduced processing rate may lead to reduced power consumption in such digital signal processors.

As outlined above, the selection of a parameter pair M and N may depend on the transmission conditions of the optical transmission channel. It should be noted that the optical transmission channel may have different transmission conditions for the different OFDM subcarriers. In such cases, it may be beneficial to select a constellation or modulation scheme that best suites the transmission conditions of each OFDM subcarrier. Consequently, it may be beneficial to map a specific number of bits M to each OFDM subcarrier, depending on the channel conditions of the respective OFDM subcarrier. In other words, $M_1$ bits are mapped to the first OFDM subcarrier, $M_2$ bits are mapped to the second OFDM subcarrier, etc. and $M_N$ bits are mapped to the $N^{th}$ OFDM subcarrier. Consequently, such OFDM transmitters may comprise a plurality of mapping units, wherein each mapping unit is associated with one of the N OFDM subcarriers. Furthermore, the number of bits M of the digital input signal which are mapped into a constellation point is selectable for each mapping unit.

According to a further aspect of the invention, an optical OFDM receiver is provided. The OFDM receiver comprises a coherent detection unit, operable to receive an optical input signal and to convert the optical input signal into an electrical input signal. It may also comprise an analog-to-digital converter, operable to convert the analog version of the electrical input signal into a digital version of the electrical input signal.

The OFDM receiver further comprises a parameter transmission unit, operable to exchange, i.e. to transmit and/or receive, information related to a number of OFDM subcarriers N and a number of bits M. The information related to the parameters N and M may be exchanged with a corresponding OFDM transmitter and/or a control or management plane. This parameter pair M and N is used at a corresponding OFDM transmitter to generate a sent version of the optical input signal, i.e. typically an undistorted version of the optical input signal prior to transmission over the optical transmission medium. It should be noted that if individual numbers of bits $M_i$, i=1, ..., N, are selected at the corresponding OFDM transmitter for the different OFDM subcarriers, then also information associated with these parameter values is received at the OFDM receiver.

It should be noted that the parameters determining the modulation and the bandwidth, and hence the power consumption of the OFDM transmitter, i.e. M and N, may externally be set by the control plane or management plane. The OFDM receiver would then receive information related to a number of OFDM subcarriers N and a number of bits M through its parameter transmission unit from such control or management plane.

Another possibility could be that such external control or management plane provides an alternative set of parameters such as bit-rate and an optical signal-to-noise ratio (OSNR) to be achieved at the OFDM receiver. The transmitting and receiving OFDM transponders would adjust themselves to the OFDM relevant parameters M and N with minimum bandwidth and/or power consumption. In such cases the parameter transmission unit would receive such alternative set of information, which is related to a number of OFDM subcarriers N and a number of bits M, from the control or management plane. It would then exchange information related to a number of OFDM subcarriers N and a number of bits M with the OFDM transmitter, in order to eventually fix the parameters N and M to be used for the OFDM transmission.

A further alternative would be an initial "negotiation" operation, where an OFDM receiver and transmitter exchange information on the channel quality and then determine themselves the OFDM parameters M and N appropriate for the actual channel condition and minimizing the overall power consumption. Again, the parameter transmission unit would exchange information related to a number of OFDM subcarriers N and a number of bits M with the OFDM transmitter, in order to eventually fix the parameters N and M.

The OFDM receiver further comprises an adjustable transformation unit, operable to transform the electrical input signal into N subcarrier signals corresponding to N OFDM subcarriers. An adaptable decision unit associated with one of the N OFDM subcarriers is operable to map a part of the corresponding subcarrier signal to a constellation point represented by M bits, thereby yielding an output subcarrier signal. Typically, symbols are extracted from the subcarrier signal and the decision unit selects the constellation point from the underlying constellation which is closest to the symbol.

Finally, the OFDM receiver comprises a control unit which sets and controls the components of the OFDM receiver so that the components operate with the respective parameters, i.e. notably the transformation unit and the decision unit are adjusted according to the parameters N and M.

The OFDM receiver may also comprise an adjustable analog-to-digital converter, operable to convert an analog version of the electrical input signal into a digital version of the electrical input signal. The conversion rate of the adjustable analog-to-digital converter is preferably adjusted to the bandwidth of the electrical input signal. This may be particularly beneficial due to the high number of power intensive analog-to-digital converters (ADC) in a typical coherent OFDM receiver. Such coherent OFDM receivers comprise four ADCs, i.e. ADCs for the complex signal components I and Q of an X as well as for an orthogonal Y polarization of the transmitted signal.

According to another aspect of the invention, a method for transmitting an optical OFDM signal at an overall bit-rate is provided. The method comprises the steps of mapping M bits of a digital input signal to a constellation point, thereby yielding a subcarrier signal of one of N OFDM subcarriers. It further comprises transforming the subcarrier signal to yield an electrical output signal and converting the electrical output signal into an optical output signal. Finally, the number of OFDM subcarriers N and the number of bits M are selected such that the electrical power used to transmit the OFDM signal is minimized.

The step of selecting may comprise the steps of determining transmission conditions for the one of the N OFDM subcarriers, determining the maximum possible number of bits M that can be mapped into a constellation point for a target bit-error rate and determining the minimum number N of OFDM subcarriers, given the maximum possible number of bits M, to achieve the overall bit-rate. In order to determine the transmission conditions of the OFDM subcarriers, the bit-error rate of transmitted training sequences may be measured. If this bit-error rate is measured for different modulation schemes or constellations, then the modulation scheme can be selected which allows a maximum number of bits M to be mapped into one OFDM symbol.

According to a further aspect of the invention, an optical OFDM control signal sent from an optical OFDM transmitter to an optical OFDM receiver is provided. It comprises information associated with a number of OFDM subcarriers N and a modulation scheme used to generate an optical OFDM signal at a corresponding optical OFDM transmitter. Depending on the modulation scheme, a certain number of bits M are mapped into symbols of the OFDM subcarrier signals.

Figure 2A:
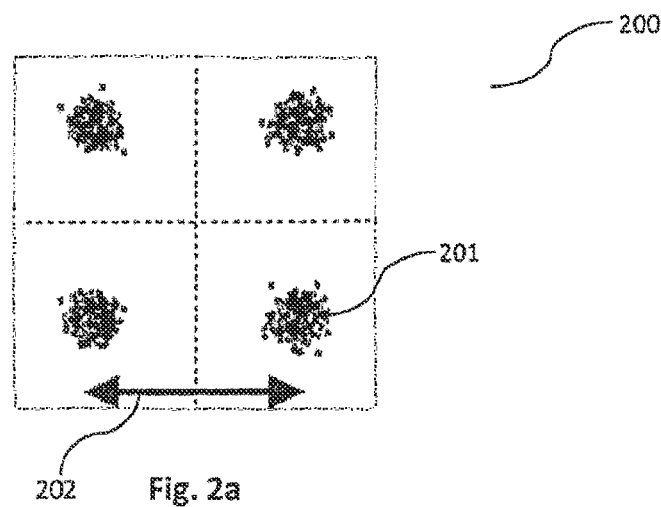
Figure 2B:
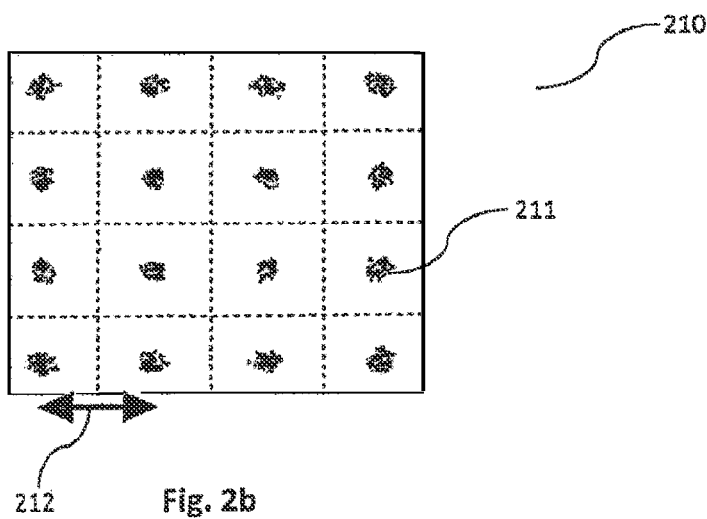
Figure 2C:
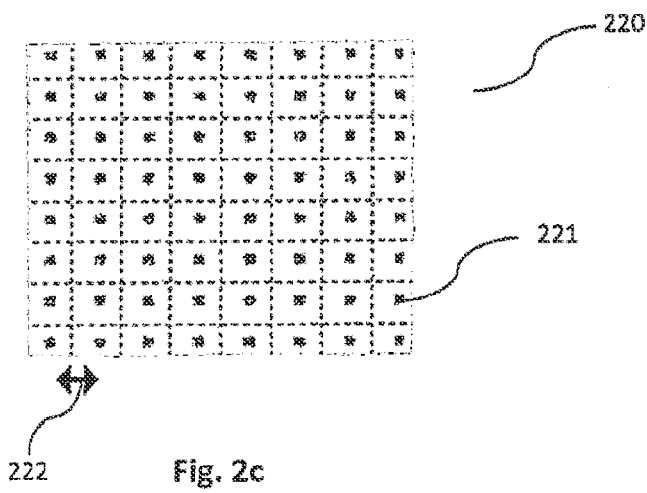
Figure 3:
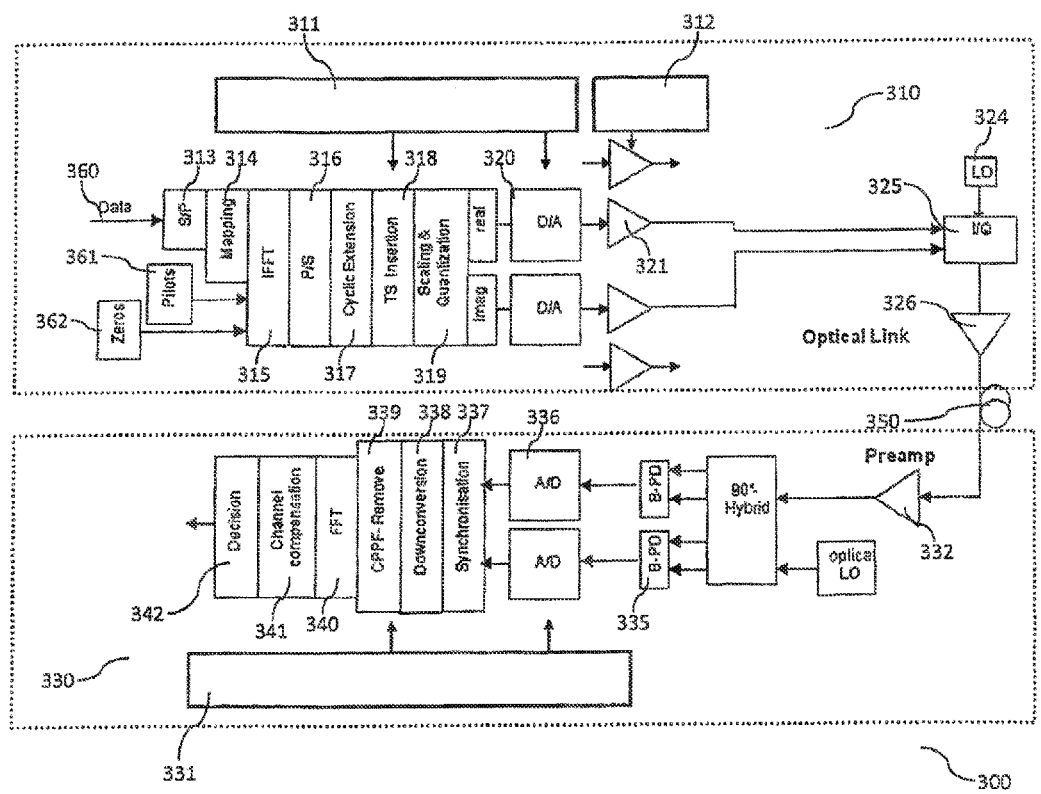

It should be noted that the above mentioned aspects of the invention may be combined with one another or extracted from one another in an arbitrary manner. The objects and features of the invention will become apparent from the following description of preferred embodiments. The present invention is described in the following by referring to exemplary embodiments illustrated schematically in the accompanying figures, wherein FIGS. 1a and 1b illustrate OFDM signals using different constellations;

FIGS. 2a, 2b and 2c illustrate the Euclidean distance between adjacent states in different constellations; and FIG. 3 illustrates an OFDM transmission system according to the invention.

Figure 1B:
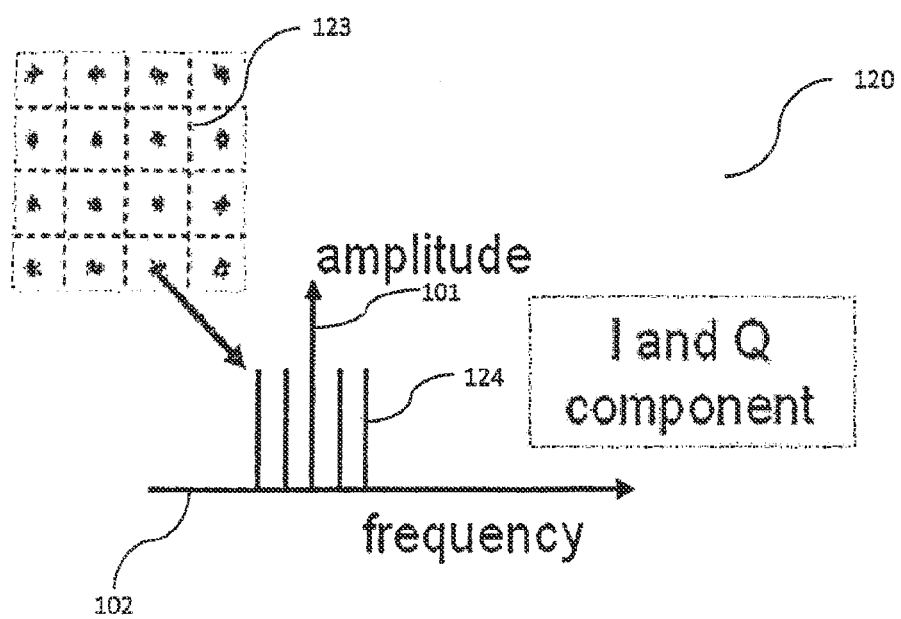

FIGS. 1a and 1b illustrate two OFDM signals 100 and 120 comprising a different number of OFDM subcarriers 104, 124 and using different constellations 103, 123. The OFDM subcarriers 104, 124 are depicted on an amplitude 101, frequency 102 diagram. FIG. 1a shows an OFDM signal 100 comprising four subcarriers 104 and using QPSK (quadrature phase shift keying) modulation, i.e. using a 2 bit constellation per subcarrier. On the other hand, FIG. 1b shows an OFDM signal 120 comprising two subcarriers 124 and using a QAM16 (Quadrature Amplitude Modulation) modulation, i.e. using a 4 bit constellation per subcarrier. As shown in FIGS. 1a and 1b the sub-carrier spacing, i.e. the frequency spacing between two adjacent OFMD subcarriers is kept constant.

It may be appreciated that both OFDM signals 100 and 120 carry the same amount of information, i.e. they have the same bit-rate. However, OFDM signal 100 has a higher bandwidth than OFDM signal 120. In the illustrated example, the bandwidth of OFDM signal 100 is two times the bandwidth of OFDM signal 120. On the other hand, the sensitivity of OFDM signal 120 is lower than the sensitivity of OFDM signal 100. In other words, the OFDM signal 120 is less tolerant to distortions incurred during transmission over an optical transmission channel than OFDM signal 100.

The reason for this is shown in FIGS. 2a, b and c. FIG. 2a illustrates a QPSK constellation 200, i.e. a constellation which maps 2 bits to one subcarrier symbol. FIG. 2b illustrates a QAM16 constellation 210, i.e. a constellation which maps 4 bits to one subcarrier symbol. FIG. 2c illustrates a QAM64 constellation 220, i.e. a constellation which maps 6 bits to one subcarrier symbol. It may be appreciated that the minimum distance between the constellation points differs for each such constellation. The constellation points 201 of the QPSK constellation have a minimum distance 202 from each other, the constellation points 211 of the QAM16 constellation have a minimum distance 212 and the constellation points 221 of the QAM 64 constellation have a minimum distance 222. It can be seen that the minimum distance decreases with the size of the constellation used, i.e. with the number of bits mapped into one subcarrier symbol.

Due to distortions incurred during transmission, an OFDM signal received at an optical OFDM receiver has subcarrier symbols which deviate more or less from the ideal constellation points. This is also illustrated in the constellation diagrams 200, 210 and 220, where the distribution of received symbols around the constellation points 201, 211, 221 is shown. As the minimum distance 202, 212, 222 between two adjacent constellation points decreases, the risk increases that a received symbol may be mapped to an erroneous constellation point 201, 222, 221. Consequently, the bit-error-rate of the transmission system increases, or in other words, the sensitivity of the OFDM transmission system decreases. It should be noted that in typical optical transmission systems, the modulation scheme or constellation is chosen such that the bit-error-rate remains below a pre-defined target value, e.g. $10^{-15}$ or $10^{-3}$ if FEC is incorporated.

In typical OFDM systems, it may be observed that the reduction of the SNR (signal to error ratio) incurred by using higher rate modulation schemes is −6.9 dB when passing from QPSK to QAM16 and −13.1 dB when passing from QPSK to QAM64. At the same time the bit-rate of typical optical OFDM systems may be increased from 10 Gb/s when using QPSK, to 20 Gb/s when using QAM16, to 30 GB/s when using QAM64.

In summary, it may be stated that the overall bit-rate of an optical OFDM transmission system may be influenced by two parameters, the number of used subcarriers N and the number of bits M mapped into one subcarrier symbol. Whereas the number of subcarriers N directly impacts the bandwidth of the OFDM system, the number of bits M impacts the sensitivity of the OFDM system.

FIG. 3 shows a typical optical OFDM transmission system 300, comprising an OFDM transmitter 310, and OFDM receiver 330 and an optical transmission channel 350. At the OFDM transmitter 310 a digital input signal 360 is received and passed into a serial-to-parallel unit 313. Such a serial-to-parallel unit 313 gathers blocks of M bits of the digital input signal 360 and passes theses blocks of M bits sequentially to a mapping unit 314 which maps each block of M bits to a symbol. The mapping is performed using the constellation of the underlying modulation scheme, e.g. QPSK, QAM16 or QAM64. The symbols are assigned to one of N subcarriers in a sequential and cyclic manner, i.e. the first symbol is assigned to the first subcarrier, the second symbol is assigned to the second subcarrier and so on. After having assigned the $N^{th}$ symbol to the $N^{th}$ subcarrier, the $(N+1)^{th}$ symbol is again assigned to the first subcarrier, and so on. It should be noted that in addition to the digital input signal 360, also pilot symbols 361 and zeros 362 may be assigned to the N subcarriers.

The N subcarriers are typically transformed using an inverse Fast Fourier Transform 315 and merged in a following parallel-to-serial unit 316, thereby yielding a digital output signal, or a digital version of an electrical output signal. This digital output signal may be further processed in a plurality of digital signal processing steps prior to transmission. By way of example, in an cyclic extension unit 317, cyclic prefix samples may be inserted to the digital output signal so as to avoid intersymbol interference (ISI). In a TS insertion unit 318, a training sequence for the determination of the conditions of the optical transmission channel 350 may be inserted. Furthermore, in a scaling & quantization unit 319 the digital output signal may be adjusted to the characteristics, notably the resolution, of the digital-to-analog converters 320.

In the digital-to-analog (D/A) converters 320 the real and imaginary part of the digital output signal is converted into two analog output signals, or an analog version of the electrical output signal. These two analog output signals are amplified in power amplifiers 321. Subsequently, the amplified analog output signals are converted into real and imaginary parts of an optical signal in an electrical-to-optical converter 324, 325. The electrical-to-optical converter 324, 325 may comprise a light diode 324 which is modulated in a modulation unit 325 with the amplified analog output signal. The OFDM transmitter or transponders 310 may also comprise an optical amplifier 326.

After transmission over the optical transmission channel 350, the OFDM signal is received at the optical OFDM receiver 330. The optical input signal may be pre-amplified 332 before being converted into an electrical input signal in a coherent detector, comprising photodiodes 335. The complex electrical input signal to the OFDM receiver 330 is converted into a digital input signal using analog-to-digital (A/D) converters 336. This digital input signal may be processed in a number of digital signal processing steps before being split into N subcarriers using a Fast Fourier Transform 340. Such processing may comprise synchronization 337, down-conversion into the baseband 338 and the removal of the cyclic prefix samples 339. After passing the Fast Fourier Transform 340, the received OFDM signal is split into N subcarriers comprising subcarrier symbols. These symbols need to be mapped to the constellation points of the underlying modulation scheme, e.g. QPSK, QAM16 or QAM64. This is done in a decision unit 342. As the received subcarrier symbols have typically incurred significant distortions during the transmission over the optical transmission channel 350, it may be beneficial to perform channel compensation 341 prior to making a decision in decision unit 342. Such a channel compensation unit 341 typically comprises channel equalizers that have been trained using training sequences inserted into the OFDM signal. Then, the decision unit 342 maps the received subcarrier symbols into blocks of M bits. The digital output signal of the OFDM receiver may be obtained by concatenating the blocks of M bits in a sequential and cyclic manner, i.e. by concatenating the blocks of M bits of the N subcarriers in a sequential and cyclic manner.

Typical optical OFDM systems 300 are designed for maximum performance, i.e. the optical transponders are designed to achieve maximum transmission rate for given channel conditions. Such given channel conditions are usually worst case channel conditions. Consequently, optical OFDM systems typically use modulation schemes with rather high sensitivity, in order to achieve low bit-error-rates over the worst case channel conditions. Such modulation schemes, e.g. QPSK, have only a relatively low number of bits M per subcarrier symbol. Therefore, the optical transponders need to employ a high number of subcarriers N, in order to meet the overall transmission bit-rate requirements.

As a consequence of the high number of subcarriers N, the optical OFDM signals have a high bandwidth. As outlined in FIG. 3, the OFDM signal passes digital-to-analog (D/A) converters 320 and power amplifiers 321, before it is transmitted over the optical transmission channel 350. Furthermore, prior to D/A conversion the digital OFDM signal is typically processed in a number of digital signal processing units, notably cyclic extension unit 317, TS insertion unit 318 and Scaling & Quantization unit 319. These digital signal processing tasks are normally performed by DSPs (Digital Signal Processors).

The high bandwidth of the OFDM signal results in a high power consumption of the components of the OFDM transmitter 310 and also of the OFDM receiver 320. In particular, the power amplifiers 321 have a power consumption that increases significantly with the bandwidth of the signal that needs to be amplified. But also the DSPs used in units 317, 318, 319 and the A/D converters 320 require an increased level of power when processing higher bandwidth OFDM signals. The same applies for the DSPs used in units 337, 338, 339 and for the D/A converters 336 of the OFDM receiver 330.

In today's telecommunication networks, the power consumption of network components is an increasingly important issue. Apart from being a significant cost component for network operators, it also represents a limiting aspect with regards to the further integration of electrical and electro-optical equipment. As a matter of fact, high power consumption leads to heat dissipation which needs to be lead off of the electrical, electronic and/or electro-optical equipment. Consequently, it is beneficial to be able to adapt the power consumption of telecommunications equipment to current network and transmission requirements. In particular, it is beneficial to be able to adapt an optical OFDM system 300 to the current conditions relating to the overall required bit-rate and the measured optical channel conditions.

Such a power adapted OFDM system 300 is illustrated in FIG. 3. Control units 311 and 312 are designed to set the parameters of the OFDM transmitter 310 to the current transmission requirements and conditions. A current transmission requirement may be the overall bit-rate that is to be achieved at a given point of time. The current transmission condition depends on the total length of the optical transmission channel 350 and optical channel conditions, e.g. PMD (polarization mode dispersion), CD (Chromatic Dispersion) and other linear or non-linear optical effects. Such transmission requirements and conditions may vary in time and it is therefore beneficial to adapt the parameters of the OFDM transmitter 310 accordingly.

The parameters of the OFDM transmitter 310 that may be modified by the control units 311 and 312 are e.g. the employed modulation scheme and the bandwidth of the OFDM signal. In other words, the control units 311 and 312 may modify the number of bits M of the input signal 360 that are mapped into one subcarrier symbol, and they may modify the number of OFDM subcarriers N. The parameter M is related to the chosen modulation scheme, wherein the parameter N influences the bandwidth of the OFDM signal.

In order to reduce the power consumption of the OFDM transmitter 310, the bandwidth of the OFDM signal should be minimized, i.e. the number of subcarriers N should be minimized. Therefore, for a given transmission bit-rate and for determined transmission conditions, the pair of parameters M and N should be selected which maximizes M and thereby minimizes N. By way of example, if the OFDM system 300 is operated at 10 Gb/s using QPSK modulation and it is determined that the current channel conditions would allow the use of a QAM16 modulation, while still maintaining an acceptable target bit-error-rate, then the control units 311, 312 would instruct the OFDM transmitter 310, in particular, the S/P unit 313, the mapping unit 314 and the IFFT unit 315 to switch to a QAM16 modulation and to reduce the number of subcarriers by a factor of two. By means of this, the overall transmission bit-rate of 10 Gb/s can be maintained, but the bandwidth of the OFDM signal is reduced by a factor two (as it is assumed that the sub-carrier spacing is kept unchanged). As a result, the control unit 312 can switch the power amplifiers 321 to a reduced bandwidth. Furthermore, the control unit 311 can reduce the processing rate (sampling rate) of the DSPs and the D/A converters in accordance to the reduced bandwidth. Consequently, the power consumption of the OFDM transmitter is reduced.

The modified parameters of the OFDM transmitter 310 need to be communicated to the OFDM receiver 330. This could be done in-band over the optical transmission channel 350 or preferably out-band using higher level control plane protocols, such as GMPLS. The modified parameters are received at and used in a control unit 331 at the OFDM receiver 330 in order to adapt the processing rate, the order of the transformation, and the mapping/constellation to those used at the OFDM transmitter 310.

It should be noted that the current channel conditions could be determined at the OFDM receiver 330. In particular, the equalization parameters of the channel compensation unit 341 could be an indicator for the degree of distortion that OFDM signals incur in the optical transmission channel 350. By the use of training sequences, the achieved bit-error-rate and the optical channel conditions could be monitored. In addition or alternatively, the current channel conditions could also be determined in a higher level control plane.

The present invention may be implemented using standard optical OFDM transponders by adding and/or modifying some of its components. In particular, the power amplifiers 321, i.e. the drive amplifiers of the modulators 325, should be a variable or switchable bandwidth amplifiers. Furthermore, the processing rate clocks of the DSPs and the D/A converters 320 should be variable. These building blocks are adjusted by the control units 311, 312 to the requirements of the optical path 350. Therefore, when switching to lower bandwidth, this will lead to lower power dissipation and consumption.

In the present document it has been described how the power consumption of OFDM systems can be optimized depending on current network requirements and conditions. By reducing the overall power consumption of optical transmission systems, the costs of running a network can be reduced. In addition, thermal management in the telecommunication equipment can be improved thereby allowing for a higher integration of the systems. Overall, a trade-off between power consumption and the sensitivity of the OFDM system is made, this trade-off corresponds approx. to a 3 dB power saving for a 3 dB sensitivity tolerance.

The invention claimed is:

1. An optical OFDM transmitter operating at an overall bit-rate, comprising:
    an adjustable mapping unit associated with one of N OFDM subcarriers, operable to map M bits of a digital input signal into a constellation point, thereby yielding a subcarrier signal of the corresponding OFDM subcarrier;
    an adjustable transformation unit, operable to transform the subcarrier signal to yield an electrical output signal;
    an electrical-to-optical converter, operable to convert the electrical output signal into an optical output signal; and
    a control unit, operable to set the number of OFDM subcarriers N and the number of bits M, such that the electrical power consumption of the OFDM transmitter is minimized for the overall bit-rate and to adjust the adjustable mapping unit and the adjustable transformation unit according to the selected numbers M and N.

2. The optical OFDM transmitter of claim 1, further comprising
    an adjustable power amplifier, which is adjusted to the bandwidth of the electrical output signal.

3. The optical OFDM transmitter of claim 2, wherein
the number of OFDM subcarriers N and the number of bits M are selected, such that the electrical power consumption of the adjustable power amplifier is minimized.

4. The optical OFDM transmitter of claim 3, wherein
the number of OFDM subcarriers N and the number of bits M are selected, such that the bandwidth of the electrical output signal is minimized.

5. The optical OFDM transmitter of claim 4, wherein the electrical power consumption is minimized in that
for a determined subcarrier transmission condition of the one of the N OFDM subcarriers and for a target bit-error-rate, the maximum possible number of bits M is selected.

6. The optical OFDM transmitter of claim 4, wherein the electrical power consumption is minimized in that
for the overall bit-rate the OFDM transmitter is operated at and for a target bit-error-rate, the number of OFDM subcarriers N is minimized.

7. The optical OFDM transmitter of claim 1, further comprising an adjustable digital-to-analog converter, operable to convert a digital version of the electrical output signal into an analog version of the electrical output signal; wherein, the adjustable digital-to-analog converter is adjusted to the bandwidth of the electrical output signal.

8. The optical OFDM transmitter of claim 7, wherein
the conversion rate of the adjustable digital-to-analog converter is adjusted to the bandwidth of the digital output signal.

9. The optical OFDM transmitter of claim 1, comprising N mapping units associated with the N OFDM subcarriers in a one-to-one relation; wherein the number M of bits of the digital input signal which are mapped into a constellation point is selectable for each mapping unit.

10. The optical OFDM transmitter of claim 1, further comprising
a parameter transmission unit, operable to exchange information associated with the number N of OFDM subcarriers and the number M of bits.

11. An optical OFDM receiver, comprising:
a coherent detection unit, operable to receive an optical input signal and to convert the optical input signal into an electrical input signal;
a parameter transmission unit, operable to exchange information associated with a number N of OFDM subcarriers and a number M of bits; wherein the numbers N and M were used at a corresponding OFDM transmitter to generate a sent version of the optical input signal;
an adjustable transformation unit, operable to transform the electrical input signal into N subcarrier signals corresponding to N OFDM subcarriers;
an adjustable decision unit associated with one of the N OFDM subcarriers, operable to map a symbol of the corresponding subcarrier signal to a constellation point representing M bits of a digital output signal of the OFDM receiver; and
a control unit, operable to adjust the transformation unit and the decision unit according to the numbers N and M.

12. The optical OFDM receiver of claim 11, further comprising:
an adjustable analog-to-digital converter, operable to convert an analog version of the electrical input signal into a digital version of the electrical input signal; wherein, the conversion rate of the adjustable analog-to-digital converter is adjusted to the bandwidth of the electrical input signal.

13. A method for transmitting an optical OFDM signal at an overall bit-rate, comprising the steps of:
mapping M bits of a digital input signal to a constellation point, thereby yielding a subcarrier signal of one of N OFDM subcarriers;
transforming the subcarrier signal to yield an electrical output signal;
converting the electrical output signal into the optical OFDM signal; and
selecting the number of OFDM subcarriers N and the number of bits M, such that the electrical power used to transmit the optical OFDM signal is minimized, for the overall bit-rate; said selecting comprising (a) determining transmission conditions for the one of the N OFDM subcarriers; (b) determining the maximum possible number of bits M that can be mapped into a constellation point for a target bit-error rate; and (c) determining the minimum number N of OFDM subcarriers, given the maximum possible number of bits M, to achieve the overall bit-rate.

14. An optical OFDM control unit coupled with an optical OFDM transmitter; the control unit comprising: a signal generating unit configured for sending a control signal to said optical OFDM transmitter for transmission to a control unit in an optical OFDM receiver; said control signal conveying
a number of OFDM subcarriers N used by said optical OFDM transmitter; and
a modulation scheme used by said optical OFDM transmitter;
wherein said optical OFDM control unit, said optical OFDM transmitter, and said optical OFDM receiver perform the steps of:
mapping M bits of a digital input signal to a constellation point, thereby yielding a subcarrier signal of one of N OFDM subcarriers;
transforming the subcarrier signal to yield an electrical output signal;
converting the electrical output signal into the optical OFDM signal; and
selecting the number of OFDM subcarriers N and the number of bits M,
such that the electrical power used to transmit the optical OFDM signal is minimized, for the overall bit-rate; said selecting comprising (a) determining transmission conditions for the one of the N OFDM subcarriers; (b) determining the maximum possible number of bits M that can be mapped into a constellation point for a target bit-error rate; and (c) determining the minimum number N of OFDM subcarriers, given the maximum possible number of bits M, to achieve the overall bit-rate.

* * * * *